US006749515B2

(12) United States Patent
Hedrick et al.

(10) Patent No.: US 6,749,515 B2
(45) Date of Patent: Jun. 15, 2004

(54) ROTATING BILL ACCEPTOR FOR USE WITH A GAMING DEVICE

(75) Inventors: Joseph R. Hedrick, Reno, NV (US); Jean P. Legras, Reno, NV (US); Kehl T. LeSourd, Reno, NV (US); Kirk A. Tedsen, Reno, NV (US); Eric L. Wagner, Sparks, NV (US)

(73) Assignee: IGT, Reno, NV (US)

( * ) Notice: Subject to any disclaimer, the term of this patent is extended or adjusted under 35 U.S.C. 154(b) by 165 days.

(21) Appl. No.: 09/966,058

(22) Filed: Sep. 28, 2001

(65) Prior Publication Data

US 2003/0064791 A1 Apr. 3, 2003

(51) Int. Cl.[7] .......................... A63F 13/00; A63F 9/24; A63F 1/00; A63F 9/00; G06F 17/00; G06F 19/00; A63B 71/00; A47G 15/00; A47G 29/14

(52) U.S. Cl. ............................ 463/46; 463/47; 463/25; 463/29; 273/138.2; 273/148 R; 273/148 B; 232/14; 232/41; 232/57; 312/270.1; 312/270.2; 312/270.3; 312/293.1; 312/293.2

(58) Field of Search ............................ 463/25, 16, 29, 463/46, 47; 273/138.1, 138.2, 148 R, 148 B; 194/206, 350, 249, 253, 254, 255, 256, 257, 258; 232/15, 16, 57, 28, 14, 29, 44, 30, 38, 39; 312/223.1, 223.2, 223.3, 270.1, 270.2, 270.3

(56) References Cited

U.S. PATENT DOCUMENTS

| | | | | | |
|---|---|---|---|---|---|
| 5,386,903 | A | | 2/1995 | Rothschild et al. | |
| 5,505,439 | A | | 4/1996 | Watabe et al. | |
| 5,676,231 | A | | 10/1997 | Legras et al. | |
| 5,993,317 | A | * | 11/1999 | Majima | 463/29 |
| 5,996,888 | A | * | 12/1999 | Gromatzky | 232/15 |
| 6,019,207 | A | | 2/2000 | Cole | |
| 6,066,038 | A | * | 5/2000 | Sciortino et al. | 453/17 |
| 6,067,530 | A | * | 5/2000 | Brooks et al. | 705/30 |
| 6,138,814 | A | * | 10/2000 | Miller et al. | 194/350 |
| 6,279,718 | B1 | * | 8/2001 | Nulph et al. | 194/206 |
| 6,422,670 | B1 | * | 7/2002 | Hedrick et al. | 312/223.1 |
| 6,457,586 | B2 | * | 10/2002 | Yasuda et al. | 209/534 |

OTHER PUBLICATIONS

Pictures of Rotating Bill Acceptor taken by IGT, publicly available Dec. 1999.

* cited by examiner

*Primary Examiner*—Teresa Walberg
*Assistant Examiner*—Binh-An D. Nguyen
(74) *Attorney, Agent, or Firm*—Bell, Boyd & Lloyd LLC

(57) ABSTRACT

The present invention provides a rotating bill acceptor for use with a gaming device. The gaming device includes a cabinet with a locking mechanism, where the bill acceptor is rotatably mounted within the cabinet and removably engages the locking mechanism. The locking mechanism includes one or two pins connected to the cabinet, wherein the pins are engaged by an engagement member on the bill acceptor. The bill acceptor rotates between a bill insertion position and a bill removal position and includes a cash box removably connected to the bill acceptor, which stores the bills until removed and emptied.

38 Claims, 8 Drawing Sheets

FIG.6
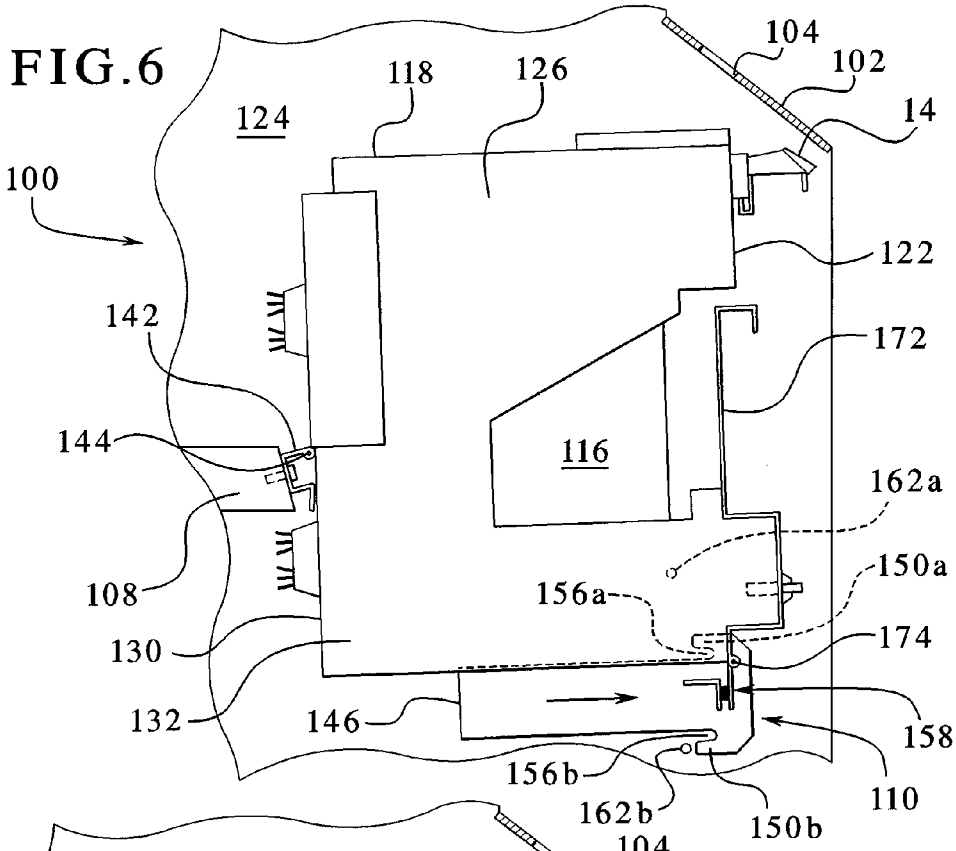
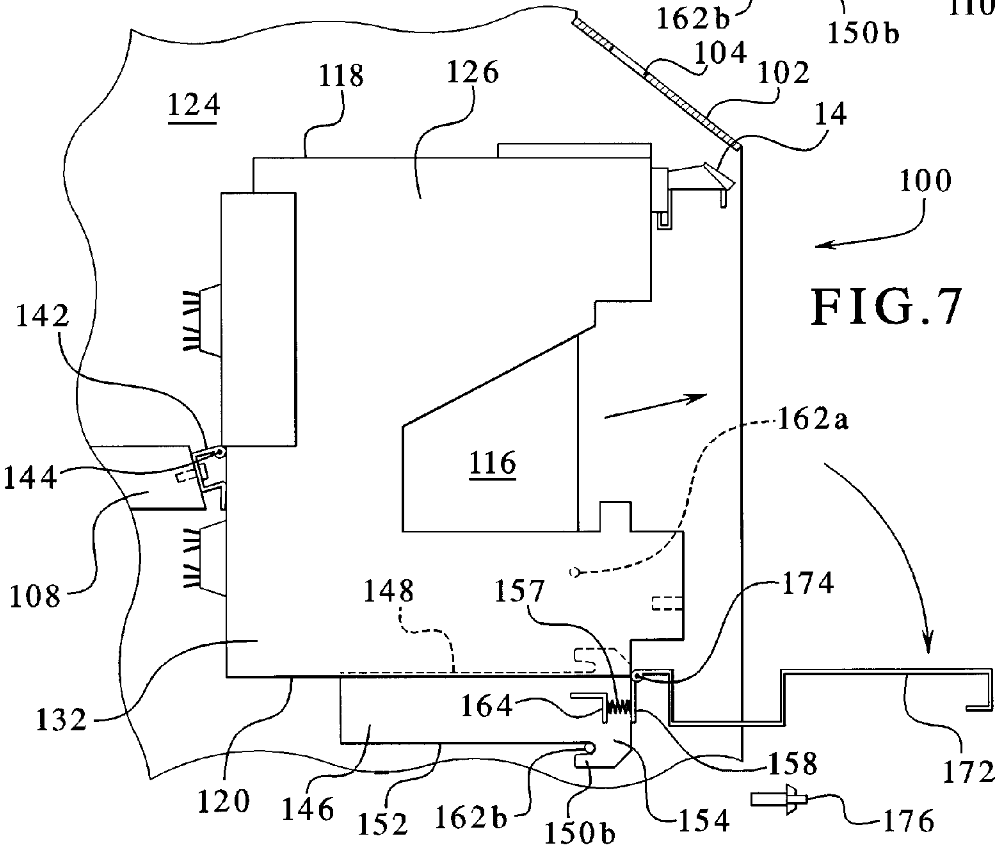
FIG.7

ROTATING BILL ACCEPTOR FOR USE WITH A GAMING DEVICE

DESCRIPTION

The present invention relates in general to a bill acceptor, and more particularly to a rotating bill acceptor for use with a gaming device.

BACKGROUND OF THE INVENTION

Gaming devices currently employ bill acceptors which arrange and store bills in a receptacle or cash box. Collection personnel in casinos or other gaming establishments regularly open gaming devices to access the bill acceptors and remove the bills. It is not uncommon for gaming devices to store $20,000 or more between collection cycles, and thus operators of gaming machines take special precautions to safeguard such devices.

Accordingly, secure bill acceptors have been added to different gaming devices such as slot machines and video poker machines. One drawback of certain currently available bill acceptors is that their cash boxes are difficult to access by collection personnel. For example, in some machines, bill acceptors are mounted in a large steel box on the side of the device. In other designs, the bill acceptors are mounted towards the back of the device. Collection personnel prefer that the bill acceptors be integrated into the gaming devices at locations and in arrangements such that the cash boxes are easy to access.

It should also be appreciated that gaming devices generally include a bill insertion slot in the front of the housing or cabinet of the gaming device. Preferably, this bill insertion slot is located on the gaming device in the player's cone or line of sight (i.e., the region of the gaming device in the player's view when the player is focusing on the display). However, positioning the bill acceptors in the gaming devices at locations that are easily accessible by the collection personnel has in some instances required locating the bill insertion slot outside the player's cone of sight, requiring that the player search and then reach out to the insertion slot to insert a bill. This can be awkward for the player. Gaming devices that are awkward to use may not be popular with players.

One attempt to solve this problem is to utilize movable secure bill acceptors which have bill insertion slots that are in the player's cone of sight. These movable secure bill acceptors enable the collection personnel to reposition the bill acceptor, making accessing the cash box easier. However, certain currently available bill acceptors employ piston-like devices that are subject to substantial wear. Accordingly, there is a need for a convenient bill acceptor which is not subject to substantial wear and which enables operators to easily access the cash box of the bill acceptor.

SUMMARY OF THE INVENTION

The present invention provides a rotating bill acceptor, and more particularly a rotating bill acceptor for use with a gaming device. The rotating bill acceptor of the present invention includes a body that defines a bill insertion slot, wherein the bill insertion slot is mounted within the player's cone or line of sight. The bill acceptor of the present invention is adapted to rotate or pivot about a pivot point from a bill insertion position to a bill removal position and back. By rotating the bill acceptor, an operator may readily remove a cash box when the bill acceptor rests in the bill removal position. The rotation allows the removal to take place without interference from nearby components, such as the player rest or bolster. After the operator replaces the cash box, the operator rotates the bill acceptor in the reverse direction to the bill insertion position.

The bill acceptor includes an engagement member that engages a locking mechanism attached to the housing or cabinet of the gaming device. In one embodiment, the engagement member is a bracket connected to the body of the bill acceptor. The engagement member has an elongated portion and hooks extending generally transversely from the bottom of the elongated portion. The hooks are adapted to engage the locking mechanism which, in one embodiment, includes a pin or set of pins connected to an interior surface of the housing or cabinet of the gaming device. In this embodiment, when the rotating bill acceptor is in the bill insertion position, a first hook engages a first pin. In the bill removal position, a second hook engages a second pin. The engagement member includes a lever that enables collection personnel to move the engagement member relative to the body of the bill acceptor such that the hook disengages the first pin and engages the second pin.

In another embodiment of the present invention, the engagement member of the rotating bill acceptor is slideably attached to the base of the body of the bill acceptor. The engagement member has only one hook. In the bill insertion position, the engagement member engages a locking mechanism which, here, is a pin connected to an interior surface of the housing or cabinet of the gaming device. The engagement member is in a position closest to the front portion of the bill acceptor when it engages the pin.

The bill acceptor includes a door pivotably connected to the body of the bill acceptor by a hinge at a base of the body. The hinge enables the door, when opened, to rotate downward. The door includes a locking device in its front to secure the door in the closed position prior to bill removal.

To remove the cashbox, the locking device is actuated to unlock the door of the bill acceptor body. The door is rotated downwardly. As the door rotates downwardly, the base of the door engages the engagement member. The engagement member slides along the base of the bill acceptor body towards the back of the bill acceptor body. The hook of the engagement member disengages the pin. The bill acceptor then rotates downwardly at a point where the back portion of the bill acceptor is hingedly connected to the interior surface of the gaming device. The bill acceptor is then in a position for easy removal of the cash box. Accordingly, the door of the bill acceptor of the present invention serves a dual purpose. The door is opened to provide access to the cash box and to cause the bill acceptor to rotate downwardly into a more accessible position. Thus, removing the cash box is facilitated by one easy step.

It is therefore an advantage of the present invention to provide a rotating bill acceptor for use with a gaming device.

It is also an advantage to provide a bill acceptor that gives access to a cash box and to an operator via one manual movement. Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 6 is a partial elevation view of a gaming device illustrating the bill acceptor moving towards the cash removal position.

FIG. 7 is a partial elevation view of a gaming device illustrating the bill acceptor in the cash removal position with the door open.

DETAILED DESCRIPTION OF THE INVENTION

Figure 1:
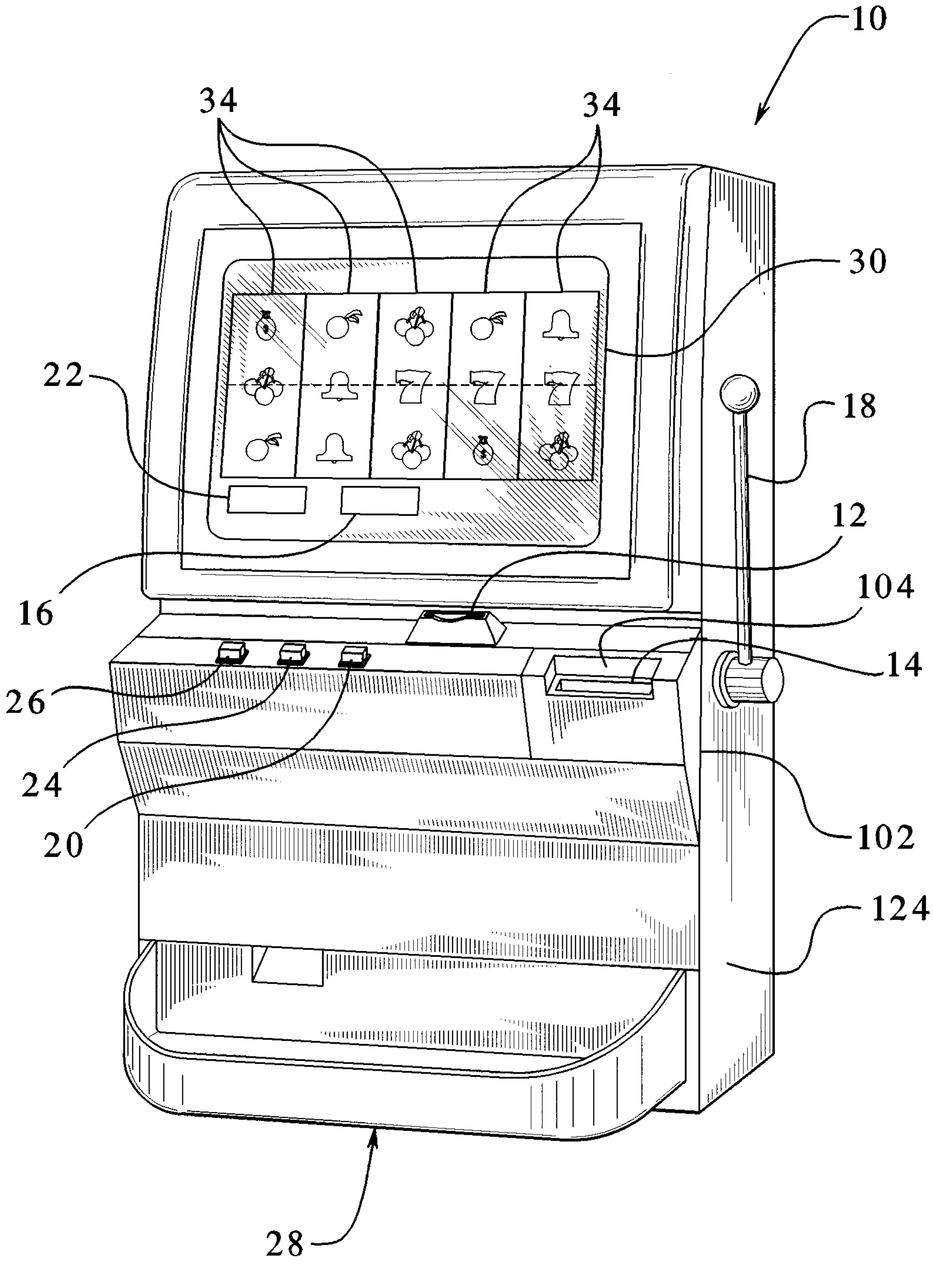
FIG. 1 is a perspective view of a gaming device.

Referring now to the drawings, the present invention is adapted to be used in a gaming device such as the gaming device 10 illustrated in FIG. 1. Gaming device 10 preferably has controls, displays and features of a conventional gaming machine and is constructed so that a player can operate it while standing or sitting. However, it should be appreciated that gaming device 10 can be constructed as a slant top gaming device (not shown), which a player primarily operates while sitting. Gaming device 10 can be constructed with varying cabinet and display designs.

Gaming device 10 can incorporate any primary game such as slot, poker, blackjack and keno, any of their bonus triggering events and any of their bonus games. The symbols and indicia used on and in gaming device 10 may be in mechanical, electrical or video form.

As illustrated in FIG. 1, gaming device 10 includes a coin slot 12 and bill insertion slot 14, where the player inserts coins, tokens or bills. The player can place coins in a coin slot 12 or paper money in a bill inlet 14, which defines a bill insertion slot sized to receive bills. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

Gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The player cashes out by using a cashout button 26 and receives coins in a coin payout tray 28. Gaming device 10 also includes one or more display devices. The embodiment illustrated in FIG. 1 includes a central display device 30 displaying a plurality of reels 34.

The gaming device 10 includes a door 102, which is preferably pivotally connected to a housing 124 of gaming device 10. The door 102 provides access to the interior of the gaming device. The door 102 further defines a receiving hole 104 that receives the bill inlet 14 of the bill acceptor assembly. The bill acceptor assembly of the present invention is generally located behind and below the bill inlet 14. The bill inlet 14 as seen in FIG. 1 couples to the bill acceptor and, under normal operation of gaming device 10, extends through the opening 104 defined by door 102. The bill inlet 14 may mate with a thin molded plastic panel (not shown) that covers a portion of the outside surface or door 102 of gaming device 10. To remain fairly unobtrusive and to make the bill inlet 14 appear as an integrated component of gaming device 10, the bill inlet 14 generally does not extend more than about 2.5 inches (6.4 cm), and more preferably not more than about 0.8 inch (2 cm) beyond the outside surface of the gaming device 10. The bill inlet 14 is preferably mounted on the door 102 within the player's cone or line of sight. Such positioning is generally more ergonomic, making the player feel more comfortable and therefore more likely to continue playing gaming device 10.

A first primary embodiment for rotating bill acceptor 100 is illustrated by FIGS. 2 through 7. The bill acceptor 100 is shown in these figures having a body 126. The body 126 has a front wall 122 and a back wall 130. The body 126 has side walls 132 and 134 connected or joined to the front and back walls of the body. Body 126 includes a top wall 118 and a bottom wall 120, which respectively connect to the front, back and side walls 122, 130, 132 and 134. It should be appreciated that the body 126 can be manufactured in any conventional manner and from any suitable material. In one embodiment, the body 126 is manufactured using rolled steel. The body 126 can be formed from a single piece of steel or assembled from two or more parts that are welded, bolted or otherwise joined to form an integral unit.

Figure 4:
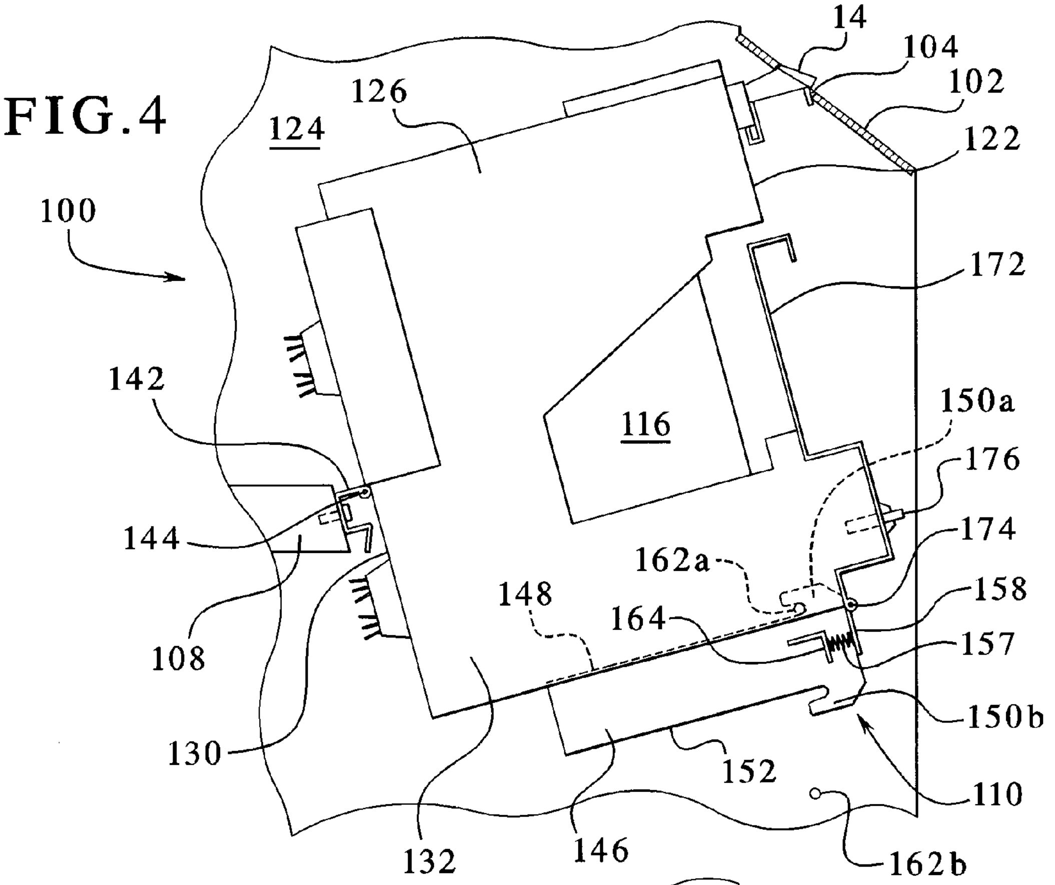
FIG. 4 is a partial elevation view of a gaming device illustrating the bill acceptor in a cash insertion position.
Figure 5:
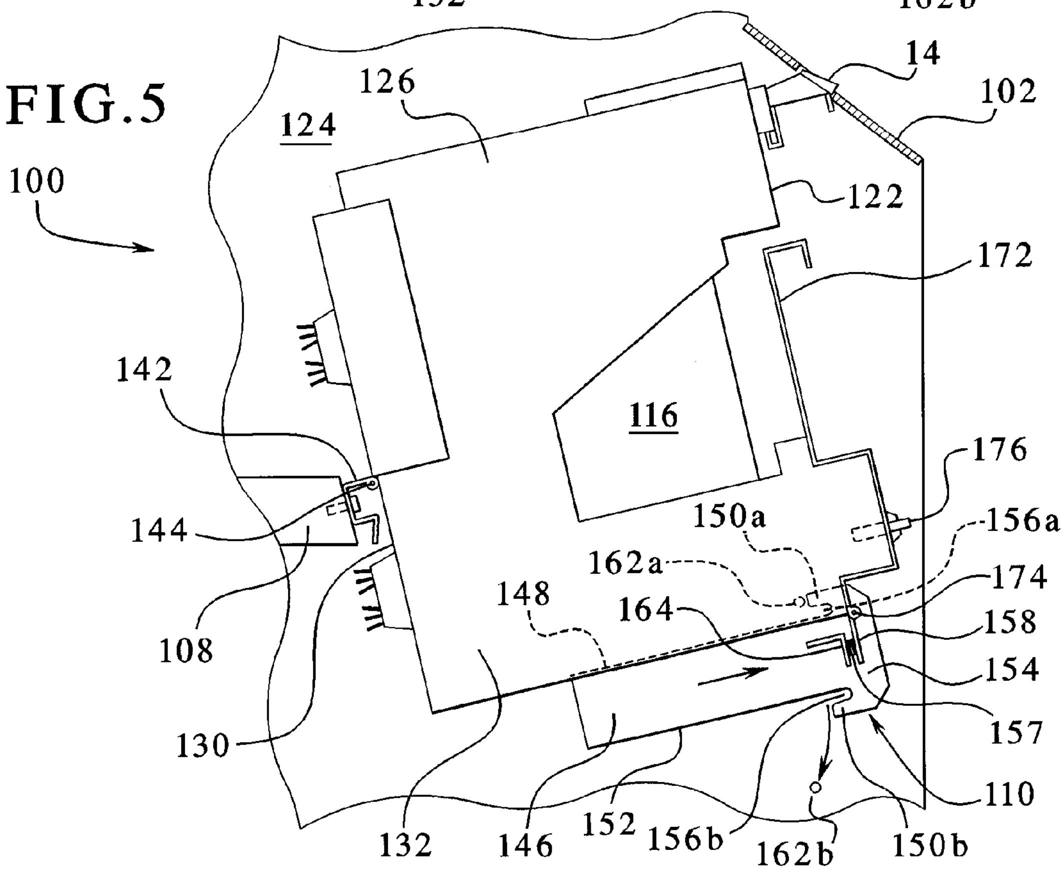
FIG. 5 is a partial elevation view of a gaming device illustrating the bill acceptor engagement member disengaging the locking mechanism.
Figure 8:
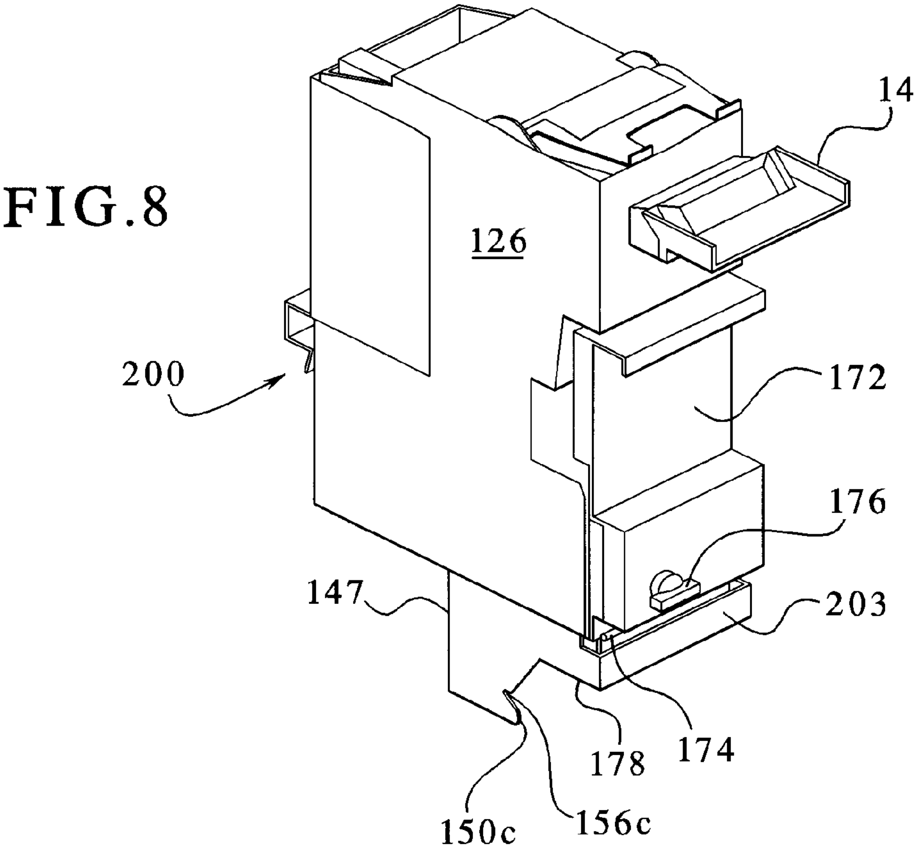
FIG. 8 is a first side perspective view of an alternate embodiment of the bill acceptor of the present invention.
Figure 9:
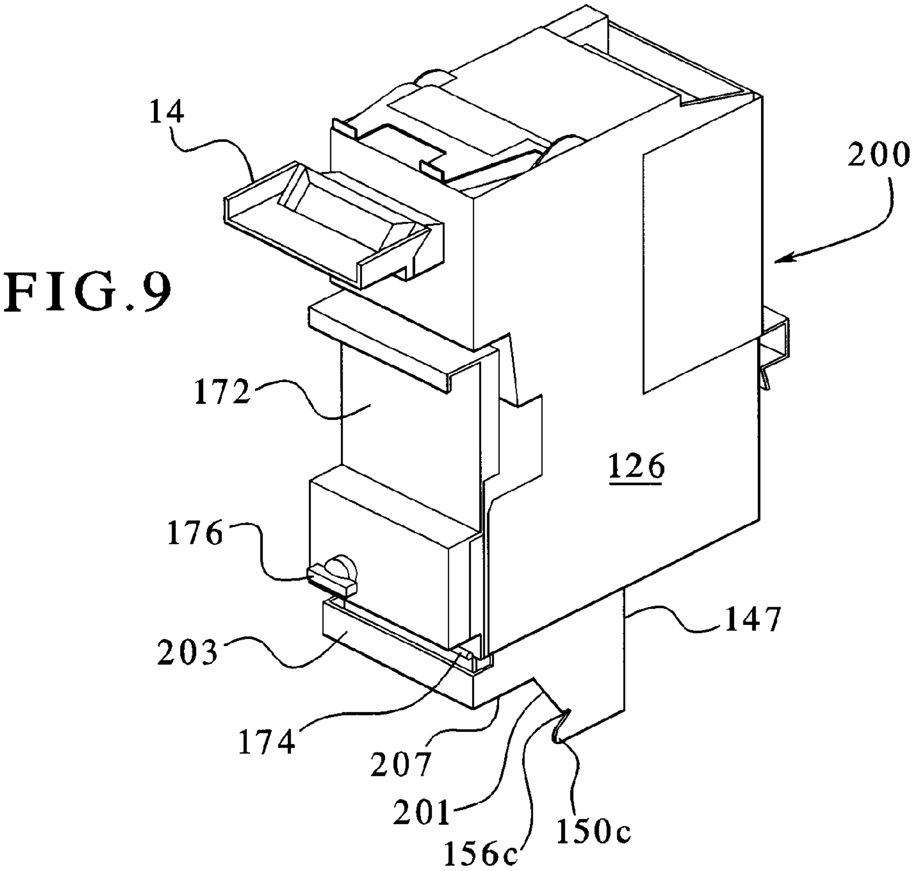
FIG. 9 is a second side perspective view of a bill acceptor of the present invention.

In one embodiment, bill acceptor 100 is adapted to rotate or pivot relative to a fixed member 108 and engage fixed pins 162*a* and 162*b* via a locking mechanism 110, as illustrated in FIGS. 4 through 7. The bill acceptor 100 is adapted to rotate relative to a member 108, which fixes to the housing 124 of gaming device 10. The bill acceptor 100 rotates between a bill insertion position illustrated in FIG. 4 and a bill removal position illustrated in FIG. 7. FIGS. 5 and 6 illustrate bill acceptor 100 in mid-rotation. A U-shaped bracket 142 is attached to the fixed member 108 and pivotally connects to the back wall 130 of the body 126 to the fixed member 108. A pivot 144 rotatably connects the body 126 to the fixed bracket 142. Bracket 142 connects to the member 108 via a bolt or screw and may have a slot to allow for minor adjustments. The bracket 142 is adapted to stop and hold the body 126 in the bill removal position (FIG. 7). Although not illustrated, the bracket 142 or a separate member or device may be provided to form a physical stop for the body 126 at the desired bill insertion angle about the pivot 144. The physical stop is fixed to the housing 124 in such a location that it abuts the body 126 when the body rotates about pivot 144 to the desired bill insertion position.

In the bill insertion position (FIG. 4), the bill acceptor assembly 100 tilts towards the back of the gaming device 10, so that the top wall 118 of the bill acceptor 100 extends closer to the rear of the housing 124 of the gaming device 10 than does the bottom wall 120. The front wall 122 of bill acceptor 100 in one embodiment makes approximately a twelve degree angle relative to a vertical plane. It should be appreciated that while a twelve degree angle may be used in one embodiment, any suitable angle (from approximately 5 degrees up to and exceeding 180 degrees is contemplated).

In the bill removal position illustrated by FIG. 7, the top wall 118 of the bill acceptor 100 rotates so that it is substantially perpendicular to the front of gaming device 10. The bill acceptor and a cash box 116 integral with the bill acceptor assembly 100 are accessible through the door 102 pivotally connected to the housing 124 of gaming device 10.

After an operator opens door 102 to access the interior of gaming device 10, the operator can remove the bill acceptor assembly 100 from the gaming device 10. When the operator rotates the bill acceptor assembly 100 to the bill removal position of FIG. 7, the bill inlet 14 disengages from the receiving slot 104 in the door 102. In the illustrated embodiment, the inlet 14 simply falls from the slot 104. Alternatively, the inlet snap fits into the slot 104, requiring the operator to push the inlet 14 through the slot 104.

The bill acceptor assembly 100 preferably houses a bill validator (not shown), and a bill transport (not shown), which are well known to those of skill in the art. The assembly also includes a bill storage portion or cash box 116. The bill validator includes various detectors and associated electronics/logic to optically and magnetically verify that bills inserted into the gaming machine are valid. Bill validators are well known and may be obtained, for example, from Rowe International of Whippany, N.J., Japan Cash Machine Co., LTD. of Osaka, Japan, Mars Electronics, Inc. of West Chester, Pa., and Dixie Narco, Inc. of East Lake, Ohio. The bill transport moves validated bills from the bill validator to the cash box 116, which stores the validated bills.

Figure 2:
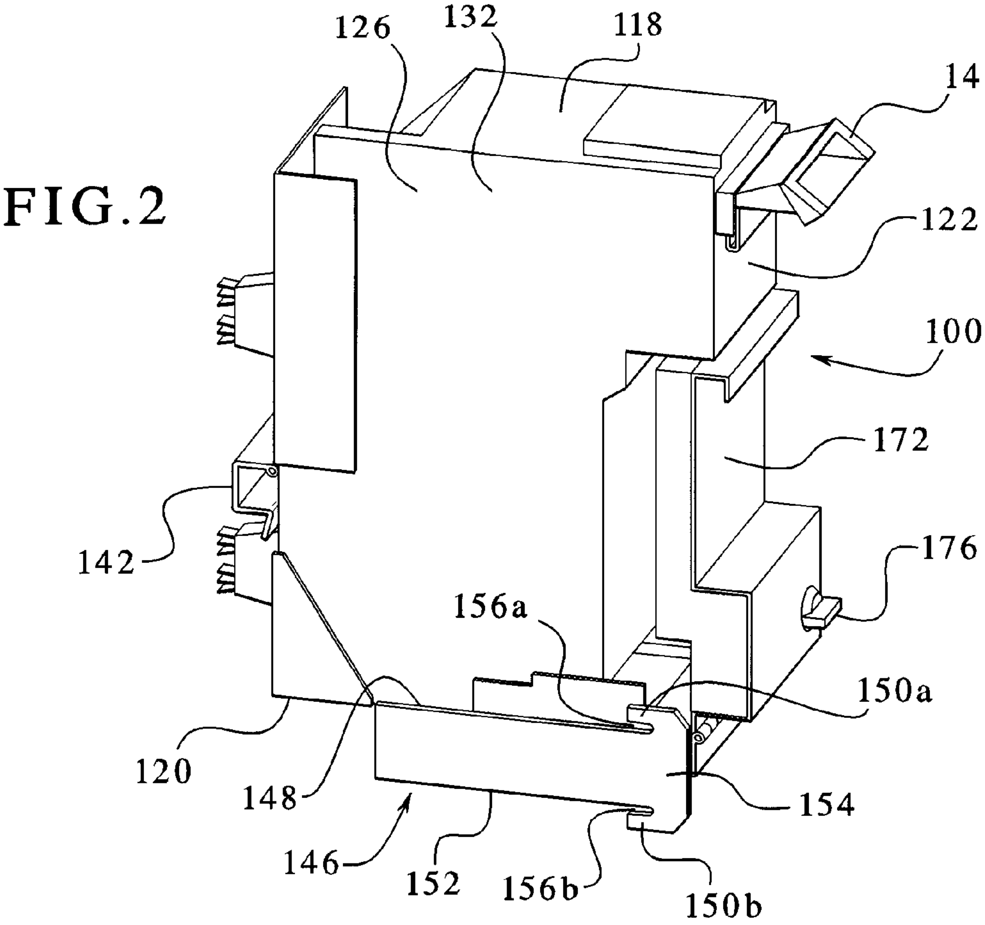
FIG. 2 is a first side perspective view of a bill acceptor of the present invention.
Figure 3:
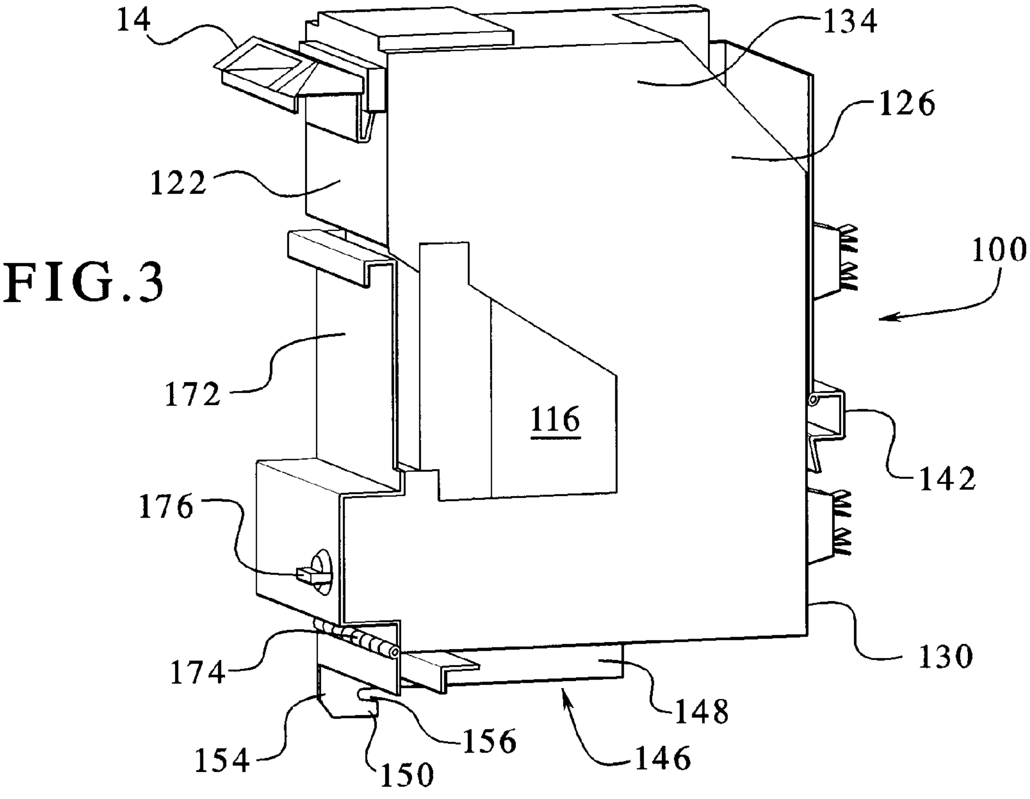
FIG. 3 is a second side perspective view of a bill acceptor of the present invention.

A locking mechanism 110 couples to the rotating bill acceptor 100 and includes an engagement member 146. In one embodiment, the engagement member 146 is a generally T-shaped bracket slideably or moveably connected to either of side walls 132 and 134 of the body 126. The engagement member 146 in the illustrated embodiment connects to the side portion 132, as illustrated in FIG. 2. Alternatively, engagement member 146 may be adapted to slideably connect to both of the side portions 132 and 134, the bottom portion 120 or the top portion 118, depending on gaming device 10.

In an embodiment, engagement member 146 defines upper and lower hooks 150*a* and 150*b*, which respectively extend from upper and lower edges 148 and 152 at a front end 154 of engagement member 146. In the illustrated embodiment, hooks 150*a* and 150*b*, define slots 156*a* and 156*b*, respectively. The slots 156*a* and 156*b* engage devices or pins 162*a* and 162*b*, respectively, which are fixed to the housing 124 of gaming device 10. The position of the upper device or pin 162*a* defines the bill insertion position (FIG. 4), while the position of lower device or pin 162*b* defines the bill removal position (FIG. 7).

While in one embodiment the present invention employs the pins 162*a* and 162*b*, it should be appreciated that any suitable device or structure may be employed. For instance, instead of pins 162*a* and 162*b*, rollers, ball-bearings, studs, threaded rods, hollow or solid tubing or pipe, etc., may be employed. These devices may be welded, threaded, press-fit, or attached to the housing 124 by any method known to those of skill in the art. The devices may be metal or plastic, e.g., steel, stainless steel, aluminum, copper, nylon, PVC, etc.

The locking mechanism 110 includes a biasing device or spring 157 disposed between a flange 158 which extends downwardly from bottom wall 120 of the body 126 and a stand-off 164 welded to or integrally formed with the engagement member 146. The spring 157 biases the engagement member 146 in an engaging position, that is, pushes the stand-off 164 and thus the member 146 and the body 126 rearwardly against the stationary stop or pin 162*a* (locking the bill-in position) or against stationary device or pin 162*b* (locking the bill-out position). The operator unlocks the body 126 from one of the positions by pulling the stand-off 164 or member 146 toward the operator, i.e., toward the front of the gaming device 10. As illustrated in FIGS. 5 and 6, when the operator pulls the engagement member 146 towards the front wall 122, the spring 157 compresses and the relevant slot 156*a* or 156*b* of the relevant hook 150*a* or 150*b* disengages from the relevant pin 162*a* or 162*b*. Thereafter, the body 126 is able to be rotated.

When an operator releases the engagement member 146, and body 126 is in either the bill-in or bill-out position, the spring 157 biases the engagement member 146 towards the engaging position such, wherein the slot 156*a* or 156*b* of the hook 150*a* or 150*b* engages and locks onto the device or pin 162*a* or 162*b*. More specifically, upper hook 150*a* engages upper device or pin 162*a* to lock the body 126 in the bill insertion position as illustrated in FIG. 4. The lower hook 150*b* engages lower device or pin 162*b* to lock the body 126 in the bill removal position as illustrated in FIG. 7. Although not illustrated, engagement member 146 may include other extensions or pull tabs besides stand-off that facilitate the operator in grasping the member.

FIGS. 4 and 7 illustrate the spring 157 in a generally uncompressed state. To keep the spring, while uncompressed, from dislodging or falling from between the flange 158 of the body 126 and the stand-off 164 of the translating member 146, a blind hole may be milled into the engaging faces of the flange 158 and the stand-off 164, wherein spring 157 sits slightly into the blind holes. Those of skill in the art may adapt other ways to secure the spring 157.

The cash box 116 of the bill acceptor assembly 100 is removable. In an embodiment, the body 126 includes a bracket or rails (not shown) that slideably restrain the cash box so that it normally and operably maintains communication with the bill transport. In an embodiment, the cash box 116 includes one or more pegs, pins or extended members that engage a bracket or rails (not shown) to thereby removably connect the cash box 116 to the body 126. The cash box 116 may be adapted to include a handle to facilitate manual removal. Alternatively, finger indents or other suitable device may be provided to assist the operator in removing the cash box 116 from the body 126 of the bill-acceptor 100 and from the housing 124 of gaming device 10.

A door 172 rotatably connects to body 126 at front wall 122. In the illustrated embodiment, the door 172 connects to the body 126 by a hinge 174 and includes a locking device 176 to secure the door 172 to the body 126. In one embodiment, the locking device 176 includes a keyed lock having a cam that, when turned, pivots a plurality of hooks, allowing the door 172 to disengage from the body 126 and swing open. The locking device 176 is not meant to absolutely secure the cash box 116, as the main door 102 of gaming device 10 contains a secured lock. Rather, locking device 176 in one embodiment requires a key for opening and holds the cash box 116 in place to provide a layer of security when the main door 102 is open. In alternative embodiments, locking device 176 may be a removable bolt or pin or employ a magnet or other suitable fastening device.

Otherwise, the door 172 may be adapted to press-fit into the body 126. It is also contemplated that the bill acceptor 100 may include a moveable latch mechanism adapted to secure the cash box 116 in place and so that rotating the bill acceptor 100 to the bill removal position automatically disengages the latch.

During the collection cycle, when the cash box 116 is to be removed and emptied or replaced, the operator first unlocks and opens the door 102, gaining access to the interior of gaming device 10. At this point, the bill acceptor 100 is in the bill insertion position with the slot 156*a* of hook 150*a* engaging pin 162*a*, so that the operator, at this point, cannot access the cash box 116. The operator pulls the stand-off 164 or the engagement member 146 towards the front wall 122 so that the hook 150*a*, and thus the engagement member 146, disengage the device or pin 162*a*. The operator rotates the bill acceptor 100 downwardly about an axis provided by the pivot 144 so that the bill acceptor 100 faces substantially flush towards the open front end of gaming device 10, as illustrated in FIGS. 5 and 6.

The operator continues rotating the bill acceptor 100 downwardly to the bill removal position until hook 150*b* engages device or pin 162*b*. In the bill removal position, the operator may readily access the cash box 116 and remove the same. The operator unlocks the locking device 176, opens door 172, and removes the cash box 116 as illustrated in FIG. 7. After the operator removes the full cash box 116, the operator typically replaces it with an empty cash box 116, which remains in place until the next collection cycle. The operator may alternatively remove bills from the box and replace the same cash box. The operator then rotates the bill acceptor 100 back to the bill insertion position, wherein the hook 150*a* of the engagement member 146 engages the device or pin 162*a*.

Referring now to FIGS. 8–13, a second primary embodiment for the bill acceptor 200 is illustrated. In many respects, this embodiment is similar to the one above. For instance, the bill inlet 14 inserts through the mounting hole 104 defined by the door 102, the door hingedly connected to the housing 124 of gaming device 10, wherein the bill acceptor 200 is in the bill insertion position illustrated by FIGS. 11 and 12. Also, the body 126 of the bill acceptor 200 rotates about pivot 144, connected to the structure 142 of the member 108, which fixes to the housing 124.

One difference in this embodiment is that only one device or pin 162*a* or set of pins 162*a* extends from the housing 124 of gaming device 10. Second, an alternative engagement member 147 is configured so that a top wall of a slot 156*c* defined by a hook 150*c* in the member 147 rests on the stop or pin 162*a* when the bill acceptor 200 is in the bill insertion position (see FIG. 11). A ridge 207 defined by the alternative engagement member 147 rests on the device or pin 162*a* when the bill acceptor 200 is in the bill removal position (see FIG. 13).

Figure 10:
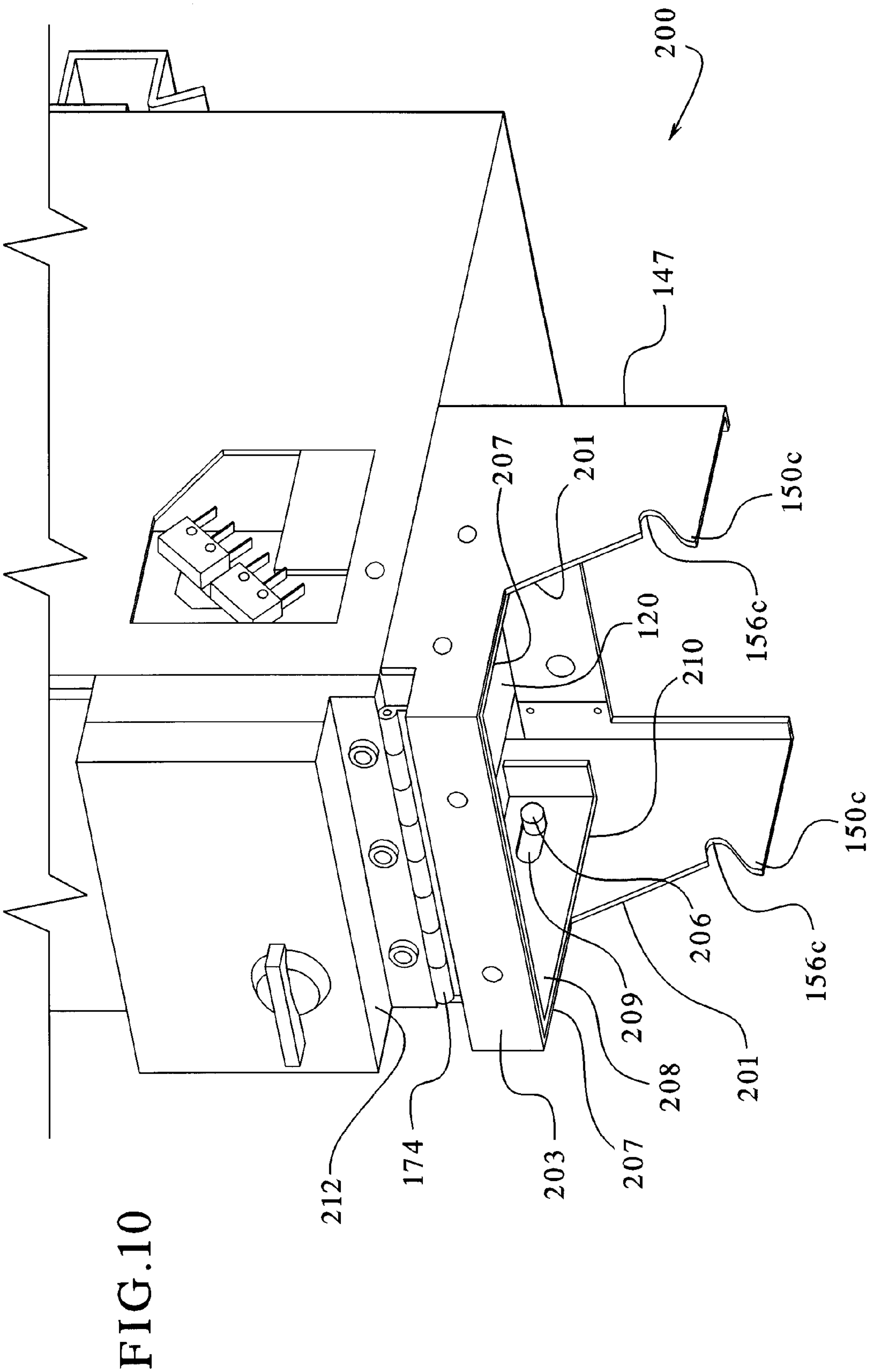
FIG. 10 is a partial side perspective view of an engagement member of a bill acceptor of the present invention.

As best seen in FIG. 10, the engagement member 147 has attached studs 206 that extend inwardly through a slotted bracket 208. The bracket 208 bolts to the bottom wall 120 of the body 126. The member 147 therefore slides frontward and backward relative to the fixed bracket 208 and the body 126. In the bill insertion position, the engagement member 147 is shifted towards the front of the bill acceptor, so that the studs 206 engage the back of the slots 209 (FIG. 10). In the bill removal position, the engagement member 147 is shifted towards the back of the bill acceptor 100, so that the studs 206 engage the front of slots 209.

Although not illustrated, the engagement member 147 in one preferred embodiment is spring loaded, wherein the spring or springs are biased to hold the engagement member in the bill insertion position, e.g., at the twelve degree angle. That is, the one or more springs are biased to pull or push the engagement member 147 towards the front of the bill acceptor, so that the studs 206 engage the backs of the slots 209 (FIG. 10). In one embodiment, one or more extension springs may be hooked to a back wall of the engagement member 147 and to the bottom wall 120 of the body 126 to pull the backs of the slots 209 toward the studs 206. In another embodiment, one or more compression springs may be installed between a front edge 203 of the engagement member 147 and a member (not illustrated) fixed to and extending downwardly from the bottom wall 120 of the body 126. The compression springs would push the member 147 and thus the backs of the slots 209 towards the studs 206.

Figure 11:
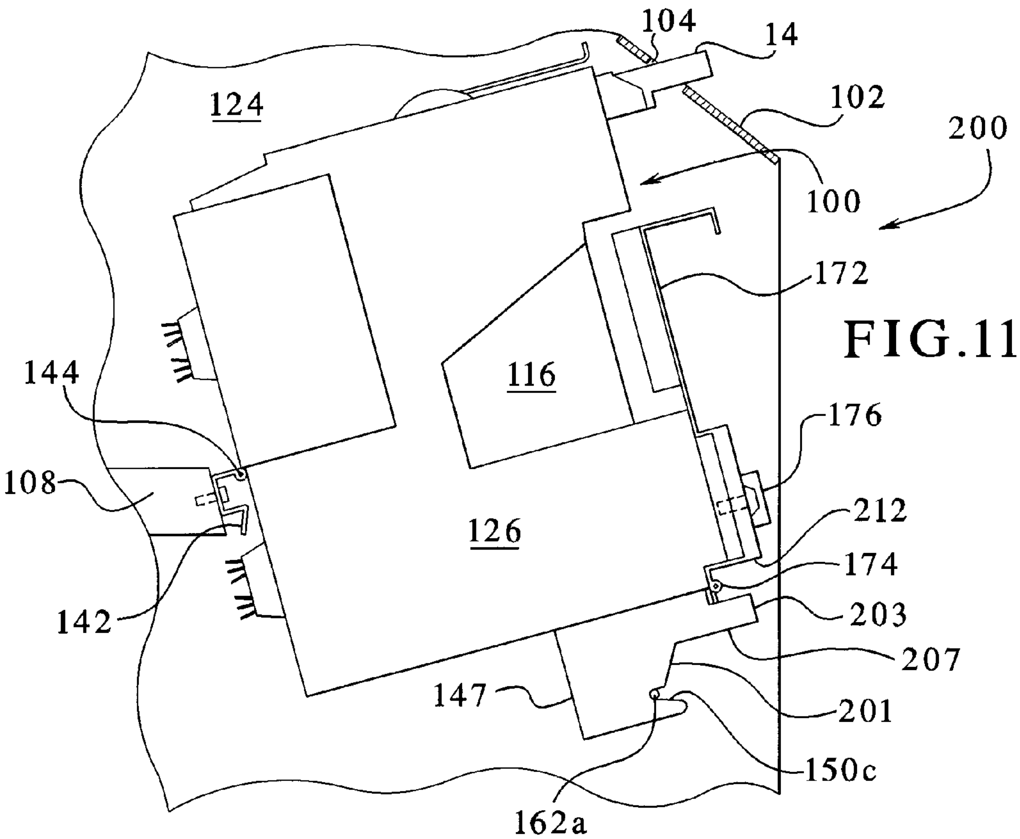
FIG. 11 is a partial elevation view of a bill acceptor of the present invention in a bill insertion position.
Figure 12:
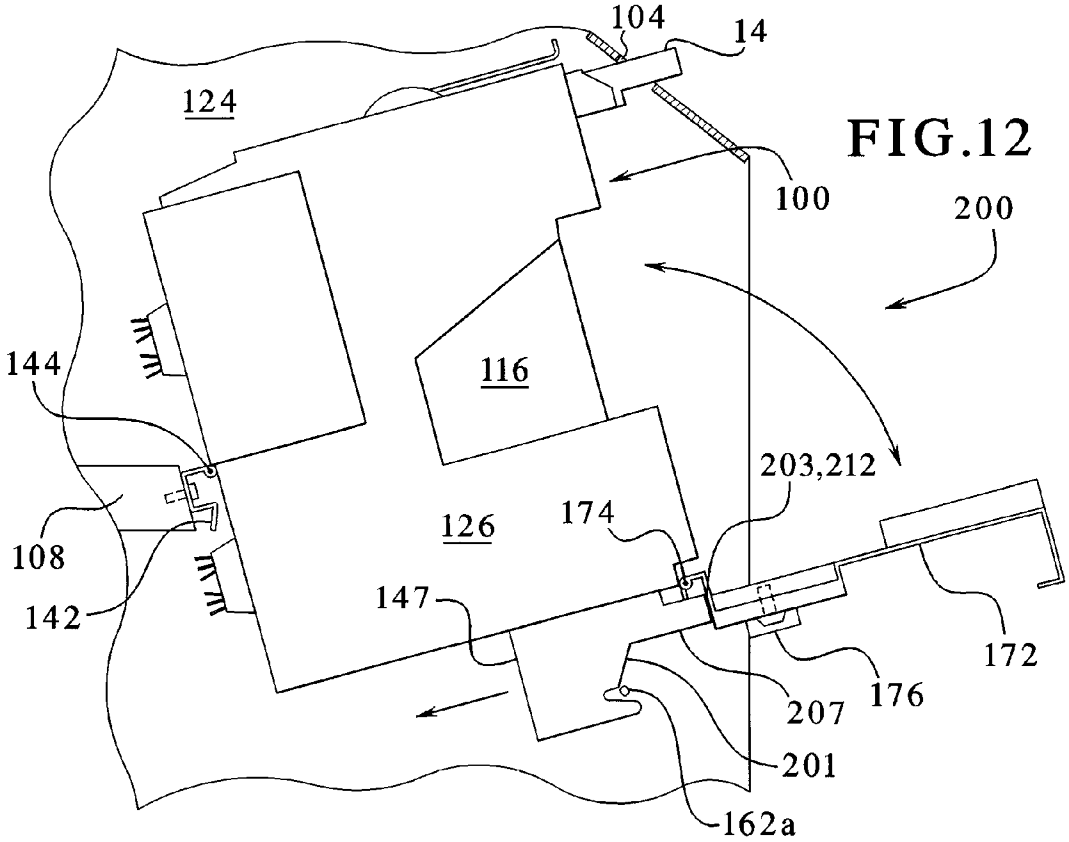
FIG. 12 is a partial elevation view of a bill acceptor of the present invention disengaging from a locking mechanism.
Figure 13:
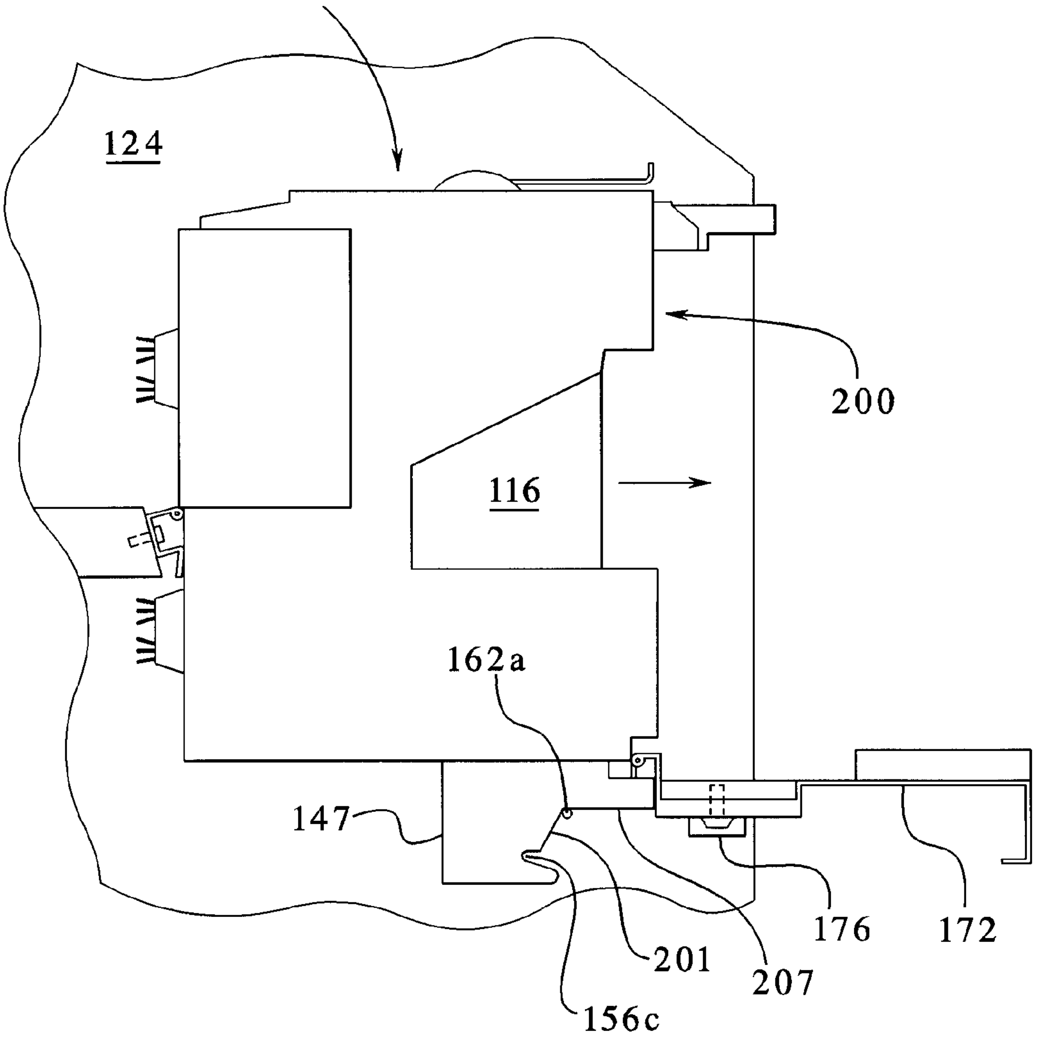
FIG. 13 is a partial elevation view of a bill acceptor of the present invention in a bill removal position.

As illustrated in FIGS. 11, 12 and 13, when the operator desires to rotate the bill acceptor 200 from the bill insertion position to the bill removal position, the operator pushes the member 147 towards the back wall 130 of the body 126 so that the slots 156*c* of the hooks 150*c* disengage from the pins 162*a*. To facilitate this movement, the door 172 is adapted to engage and push a front edge 200 of the engagement member 147 when the operator opens the door 172 to gain access to the cash box 116.

As illustrated in FIGS. 11, 12 and 13, when the operator desires to remove the cash box 116 from the bill acceptor, the operator unlocks or removes the locking device 176. The operator opens door 172 which pivots about the hinge 174. When the door rotates downwardly, the base 212 of the door engages the front edge 203 of the engagement member 147. The engagement member thereby shifts backwards and causes the hooks 150*c* to disengage from the pins 162*a*. The bill acceptor 200 then slides downward along inclines 201, whereby the ridges 207 of the bill acceptor 100 rest on the devices or pins 162*a*, the bill removal position. Thus, by opening the door 172, the operator gains access to cash box 116 and positions the bill acceptor 200 to remove the cash box 116 in one step, as illustrated in FIGS. 11, 12 and 13.

When the operator finishes switching out the cash box, the operator closes the door 172 and rotates the bill acceptor 200 upward, about pivot 144 and along the inclines 201 until the slots 156*c* of the hooks 150*c* reach the pins 162*a*. At this point, the operator pulls the engagement member 147 forward, so that the hooks 150*c* of the bill acceptor 200 rest on the devices or pins 162*a* (FIG. 11) in the bill insertion position. The weight of bill acceptor 200 keeps the engagement member 147 from moving on its own and disengaging from the pins 162*a*. Further, the one or more compression or extension springs biasing the front edge 203 of the engagement member 147 forward or away from the body 126 also keep(s) the engagement member 147 from moving on its own or from a tilt by the player. In an alternative embodiment, a pin (not illustrated) may be inserted through aligned apertures in the engagement number 147 and the bracket 208, which is fixed to the body 126, to further ensure that the bill acceptor 200 does not accidentally disengage.

While two primary embodiments have been described, the present invention may be modified in a variety of manners. For instance, in a further alternative embodiment, a track or slide may be mounted to the housing 124. The bill acceptor in this alternative embodiment includes a mating slide or track member that mates with the fixed slide or track. The mating slide or track member, in one implementation, mounts to one or both of the side walls 132 and 134 of the body 126 (see FIGS. 2 and 3).

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

a housing defining an opening;

a bill acceptor rotatably mounted in the housing;

a bill inlet extending from the bill acceptor and through the opening of the housing when the bill acceptor is in a bill insertion position;

at least one moveable engaging member adapted to engage at least one locking device affixed in said housing when the bill acceptor is in the bill insertion position; and a holding device affixed in the housing that holds the bill acceptor in a bill removal position when the bill acceptor pivots from the bill insertion position.

2. The gaming device of claim 1, wherein the engaging member includes a hook that engages the holding device fixed in the housing.

3. The gaming device of claim 2, wherein the bill inlet is disposed on an upper end of the bill acceptor and the hook is disposed on a lower end of the engaging member.

4. The gaming device of claim 1, wherein the engaging member is biased to maintain engagement with the holding device.

5. The gaming device of claim 1, which includes a spring biased so that the engaging member maintains engagement with the holding device, wherein the spring is moveable to disengage the engaging member from said holding device.

6. The gaming device of claim 5, which includes a pivot that rotatably fixes the bill acceptor inside the housing and enables rotation of the bill acceptor after the spring is moved and the engaging member is disengaged from the holding device.

7. The gaming device of claim 1, which includes a cash box removably connected to the bill acceptor.

8. The gaming device of claim 1, wherein the engaging member includes a first hook that engages the locking device and a second hook that engages the holding device.

9. The gaming device of claim 1, wherein the engaging member is biased to maintain engagement with the locking device and the holding device.

10. The gaming device of claim 1, wherein said holding device holds the bill acceptor in the bill removal position, and after rotation of the bill acceptor, said locking device holds the bill acceptor in the bill insertion position.

11. The gaming device of claim 1, wherein the engaging member can be moved to allow the bill acceptor to be rotated away from the locking device.

12. The gaming device of claim 1, wherein the engaging member can be translated in a direction to thereafter allow the bill acceptor to be rotated and translated in an opposite direction to allow the bill acceptor to be secured in one of the positions.

13. The gaming device of claim 1, which includes a door that when opened provides access to a cash box and disengages the engaging member from the locking device so that the bill acceptor can rotate.

14. The gaming device of claim 1, which includes a door that when opened provides access to a cash box and enables the bill acceptor to rotate towards the bill removal position.

15. A bill acceptor for use with a gaming device, said bill acceptor comprising:

a body; and at least one moveable engaging member coupled to the body and adapted to engage at least one locking device affixed inside the gaming device, so that the bill acceptor can rotate between a bill insertion position and a bill removal position.

16. The bill acceptor of claim 15, wherein the engaging member moveably couples to the bill acceptor.

17. The bill acceptor of claim 16, which includes a door pivotally connected to the bill acceptor that when opened provides access inside the body and moves the engaging member relative to the bill acceptor.

18. The bill acceptor of claim 15, which includes a cash box removably connected to the housing.

19. The bill acceptor of claim 15, which includes a bill inlet connected to the body and extending through the gaming device when the bill acceptor is in the bill insertion position.

20. The bill acceptor of claim 15, wherein the engaging member is biased to maintain engagement with the device.

21. The bill acceptor of claim 15, wherein the engaging member is biased to maintain engagement with the device when the bill acceptor is in the bill insertion position and when the bill acceptor is in the bill removal position.

22. A method for removing a cash box from a bill acceptor used with a gaming device, said method comprising the steps of:

moving a door pivotally connected to the bill acceptor which causes the bill acceptor to be rotated away from a locking device fixed inside the gaming device;

rotating the bill acceptor from a bill insertion position to a bill removal position; and removing the cash box from within the bill acceptor.

23. The method of claim 22, wherein rotating the bill acceptor includes compressing a spring.

24. The method of claim 22, wherein rotating the bill acceptor to the bill removal position includes engaging an engaging member to another device fixed inside the gaming device.

25. The method of claim 22, wherein rotating the bill acceptor to the bill removal position includes decompressing a spring.

26. The method of claim 22, wherein rotating the bill acceptor to the bill removal position includes rotating the bill acceptor in a direction opposite the bill insertion position.

27. A gaming device comprising:

a housing defining an opening;

a bill acceptor rotatably mounted in the housing;

a bill inlet extending from the bill acceptor and through the opening of the housing when the bill acceptor is in a bill insertion position;

a locking device affixed in the housing and adapted to hold the bill acceptor in the bill insertion position;

a holding device affixed in the housing and adapted to hold the bill acceptor in a bill removal position when the bill acceptor pivots from the bill insertion position;

a moveable engaging member moveably connected to the bill acceptor and operable to engage the locking device when the bill acceptor is in the bill insertion position and the holding device when the bill acceptor pivots from the bill insertion position; and a door pivotally connected to the bill acceptor that when opened moves the engaging member to cause the engaging member to disengage the locking device.

28. The gaming device of claim 27, wherein the engaging member includes a hook that engages the locking device fixed in the housing.

29. The gaming device of claim 28, wherein the bill inlet is disposed on an upper end of the bill acceptor and the hook is disposed on a lower end of the engaging.

30. The gaming device of claim 27, wherein the engaging member is biased to maintain engagement with the holding device.

31. The gaming device of claim 27, which includes a cash box removably connected to the bill acceptor when the door is opened.

32. The gaming device of claim 27, wherein the engaging member is biased to maintain engagement with the locking device or the holding device.

33. The gaming device of claim 27, wherein the engaging member can be moved to enable the bill acceptor to be rotated away from the holding device.

34. The gaming device of claim 27, wherein the engaging member can be translated in a direction to thereafter enable the bill acceptor to be rotated and translated in an opposite direction to enable the bill acceptor to be secured in one of the positions.

35. A method of rotating a bill acceptor of a gaming device having a housing and a bill acceptor mounted in the housing, said method comprising:

opening a door pivotally connected to the bill acceptor to move an engaging member and cause the engaging member to disengage a locking device connected to the housing to allow rotation of the bill acceptor to a bill removal position; and removing the cash box from within the bill acceptor.

36. The method of claim 35, wherein the engaging member is moveably coupled to the bill acceptor.

37. The method of claim 35, wherein the engaging member is biased to maintain engagement with a holding device.

38. The method of claim 37, wherein the engaging member is biased to maintain engagement with the locking device when the bill acceptor is in the bill insertion position and with the holding device when the bill acceptor is in the bill removal position.

* * * * *

UNITED STATES PATENT AND TRADEMARK OFFICE

CERTIFICATE OF CORRECTION

PATENT NO. : 6,749,515 B2
DATED : June 15, 2004
INVENTOR(S) : Joseph R. Hedrick et al.

It is certified that error appears in the above-identified patent and that said Letters Patent is hereby corrected as shown below:

Column 5,
Line 4, please change "degrees is contemplated)" to -- degrees) is contemplated --.

Column 6,
Line 28, please change "stand-off" to -- the stand-off --.

Column 10,
Lines 21 and 23, please change "the device" to -- the locking device --.

Column 11,
Line 6, please change "engaging" to -- engaging member --.

Column 12,
Line 11, please change "the cash box" to -- a cash box --.

Signed and Sealed this

Second Day of August, 2005

JON W. DUDAS
*Director of the United States Patent and Trademark Office*